US012055062B2

(12) United States Patent
Binek et al.

(10) Patent No.: US 12,055,062 B2
(45) Date of Patent: Aug. 6, 2024

(54) GAS TURBINE ENGINE SUPPORT STRUCTURE WITH INTERNAL LATTICE

(71) Applicant: Raytheon Technologies Corporation, Farmington, CT (US)

(72) Inventors: Lawrence A. Binek, Glastonbury, CT (US); Sean R. Jackson, Palm City, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/976,302

(22) Filed: Oct. 28, 2022

(65) Prior Publication Data

US 2024/0141805 A1 May 2, 2024

(51) Int. Cl.
| | |
|---|---|
| *F01D 5/24* | (2006.01) |
| *B22F 10/28* | (2021.01) |
| *B33Y 10/00* | (2015.01) |
| *F01D 25/28* | (2006.01) |
| *B33Y 80/00* | (2015.01) |

(52) U.S. Cl.
CPC ............ *F01D 25/28* (2013.01); *B22F 10/28* (2021.01); *B33Y 10/00* (2014.12); *B33Y 80/00* (2014.12); *F05D 2220/323* (2013.01); *F05D 2230/22* (2013.01)

(58) Field of Classification Search
CPC . F01D 5/24; F01D 5/243; F01D 5/246; F01D 5/28; F01D 5/048; F05D 2220/323; F05D 2230/22; B33Y 10/00; B33Y 80/00
See application file for complete search history.

(56) References Cited

U.S. PATENT DOCUMENTS

| | | | |
|---|---|---|---|
| 9,863,368 B1 | 1/2018 | Ress | |
| 10,221,694 B2* | 3/2019 | Snyder | ...................... F01D 9/02 |
| 11,162,416 B2 | 11/2021 | Butcher | |
| 2014/0205454 A1* | 7/2014 | Giovannetti | ............ F01D 5/181 |
| | | | 29/889.72 |
| 2017/0232670 A1 | 8/2017 | Joerger | |
| 2018/0187984 A1 | 7/2018 | Manzo | |
| 2019/0389138 A1 | 12/2019 | Franzen, Jr. | |
| 2020/0102844 A1* | 4/2020 | Binek | ...................... F01D 5/147 |
| 2020/0180228 A1 | 6/2020 | Satko | |
| 2021/0087955 A1* | 3/2021 | Binek | ................... F01M 11/03 |
| 2021/0207497 A1 | 7/2021 | Binek | |

FOREIGN PATENT DOCUMENTS

WO 2022212472 A1 10/2022

OTHER PUBLICATIONS

EP Search Report for EP Patent Application No. 23206515.1 dated Jan. 26, 2024.

* cited by examiner

*Primary Examiner* — David E Sosnowski
*Assistant Examiner* — Maxime M Adjagbe
(74) *Attorney, Agent, or Firm* — Getz Balich LLC

(57) ABSTRACT

A manufacturing method is provided during which a body is additively manufactured. The body includes an engine case for a gas turbine engine, a support structure and an aperture. The support structure projects out from the engine case. The support structure includes a lattice, a wall and an internal volume. The wall surrounds the lattice. The internal volume is within the support structure along the lattice. The internal volume is filled with powder. The aperture is at an intersection between the engine case and the support structure. The powder is extracted from the internal volume through the aperture.

19 Claims, 10 Drawing Sheets

GAS TURBINE ENGINE SUPPORT STRUCTURE WITH INTERNAL LATTICE

BACKGROUND OF THE DISCLOSURE

1. Technical Field

This disclosure relates generally to an aerial vehicle and, more particularly, to integrated components for the aerial vehicle.

2. Background Information

An aerial vehicle may include a gas turbine engine housed within a vehicle body. Various types and configurations of gas turbine engines and vehicle bodies are known in the art. While these known gas turbine engines and vehicle bodies have various benefits, there is still room in the art for improvement.

SUMMARY OF THE DISCLOSURE

According to an aspect of the present disclosure, a manufacturing method is provided during which a body is additively manufactured. The body includes an engine case for a gas turbine engine, a support structure and an aperture. The support structure projects out from the engine case. The support structure includes a lattice, a wall and an internal volume. The wall surrounds the lattice. The internal volume is within the support structure along the lattice. The internal volume is filled with powder. The aperture is at an intersection between the engine case and the support structure. The powder is extracted from the internal volume through the aperture.

According to another aspect of the present disclosure, another manufacturing method is provided during which a body is additively manufactured. The body includes an engine case of a gas turbine engine and a support structure projecting out from the engine case. The engine case extends axially along and circumferentially around an axial centerline. The support structure includes a lattice, an exterior wall and a passage. The lattice is configured as or otherwise includes a triply periodic minimal surface structure. The exterior wall surrounds the lattice. The passage extends within the support structure through the lattice. Powder is extracted out of the passage through an aperture in the body.

According to still another aspect of the present disclosure, an apparatus is provided for an aerial vehicle. The apparatus includes an engine case of a gas turbine engine and a support structure. The engine case extends circumferentially around and axially along an axial centerline. The support structure projects out from the engine case. The support structure includes a lattice, an exterior wall, an internal volume and an aperture. The exterior wall surrounds the lattice. The internal volume is formed by interstices within the lattice and by interstices between the lattice and the exterior wall. The aperture fluidly couples the internal volume with a plenum outside of the support structure. The engine case and the support structure are included in a monolithic body.

The lattice may be configured as or otherwise include a triply periodic minimal surface structure.

The apparatus may also include a section of a vehicle body circumscribing the engine case. The support structure may extend between and connect the engine case and the section of the vehicle body. The section of the vehicle body may also be included in the monolithic body.

The aperture may be arranged at a gravitational bottom of the internal volume during at least one of the extracting of the powder or the additive manufacturing of the body.

The aperture may project through the wall.

The aperture may be disposed outside of a fillet between the support structure and the engine case.

The internal volume may include: interstices within the lattice; and/or interstices between the wall and the lattice.

The internal volume may include a plurality of passages. The powder may be extracted from the passages through the aperture.

The support structure may also include a first member and a second member. The first member may project out from the engine case along a first trajectory. The second member may project out from the engine case along a second trajectory that is angularly offset from the first trajectory. The internal volume may be within the first member and the second member.

The first member may diverge away from the second member as the first member extends along the first trajectory.

The first member may converge towards the second member as the first member extends along the first trajectory.

An intersection between the first member and the second member may be located at the engine case.

An intersection between the first member and the second member may be located away from the engine case.

The internal volume may include a passage that follows a tortuous path through the support structure to the aperture.

The lattice structure may be configured as or otherwise include a triply periodic minimal surface structure.

A bore may extend within the lattice. The bore may be fluidly decoupled from the internal volume.

The body may also include at least a section of a vehicle body. The support structure may extend between and connect the engine case and the section of the vehicle body.

The body may also include an actuator mount spaced outboard from the engine case.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
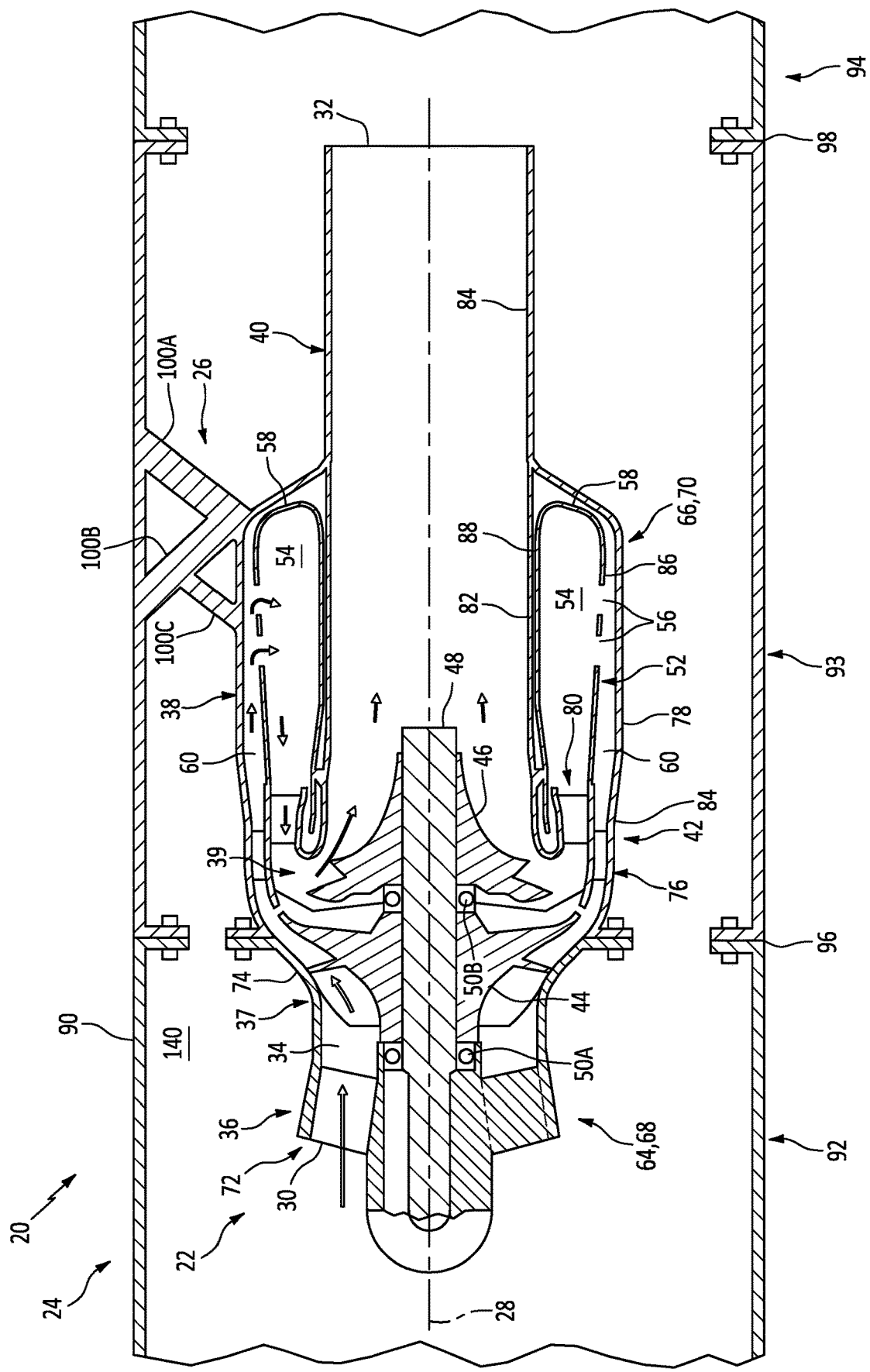
FIG. 1 is a partial side sectional illustration of an assembly for an aerial vehicle.

FIG. 1 illustrates an assembly 20 for an aerial vehicle such as, but not limited to, an unmanned aerial vehicle (UAV), a drone or any other manned or unmanned aircraft or self-propelled projectile. The vehicle assembly 20 of FIG. 1 includes a gas turbine engine 22, a vehicle body 24 and one or more engine support structures 26 (see also FIG. 2) coupling the gas turbine engine 22 to the vehicle body 24.

The gas turbine engine 22 of FIG. 1 is configured as a single spool, radial-flow turbojet gas turbine engine. This gas turbine engine 22 is configured for propelling the aerial vehicle. The present disclosure, however, is not limited to such an exemplary turbojet gas turbine engine configuration nor to a vehicle propulsion system application. For example, the gas turbine engine 22 may alternatively be configured as an auxiliary power unit (APU) for the aerial vehicle.

The gas turbine engine 22 of FIG. 1 extends axially along an axial centerline 28 between a forward, upstream airflow inlet 30 into the gas turbine engine 22 and an aft, downstream exhaust 32 out of the gas turbine engine 22. This axial centerline 28 may be a centerline axis of the gas turbine engine 22 and the vehicle body 24. The axial centerline 28 may also or alternatively be a rotational axis for one or more components within the gas turbine engine 22.

The gas turbine engine 22 includes a core flowpath 34, an inlet section 36, a (e.g., radial flow) compressor section 37, a (e.g., reverse flow) combustor section 38, a (e.g., radial flow) turbine section 39 and an exhaust section 40. The gas turbine engine 22 also includes a static engine structure 42 housing and/or forming one or more or all of the engine sections 36-40.

The core flowpath 34 extends within the gas turbine engine 22 between the engine inlet 30 and the engine exhaust 32. More particularly, the core flowpath 34 extends sequentially through the inlet section 36, the compressor section 37, the combustor section 38, the turbine section 39 and the exhaust section 40 from the engine inlet 30 to the engine exhaust 32.

The compressor section 37 includes a bladed compressor rotor 44. The turbine section 39 includes a bladed turbine rotor 46. Each of these engine rotors 44, 46 includes a plurality of rotor blades arranged circumferentially around and connected to at least one respective rotor disk and/or hub. The rotor blades, for example, may be formed integral with or mechanically fastened, welded, brazed, adhered and/or otherwise attached to the respective rotor disk(s) and/or hub(s).

The compressor rotor 44 may be configured as a radial flow compressor rotor. The turbine rotor 46 may be configured as a radial flow turbine rotor. The compressor rotor 44 may be connected to the turbine rotor 46 through an engine shaft 48. This engine shaft 48 is rotatably supported by the static engine structure 42 through a plurality of bearings 50A and 50B (generally referred to as "50"); e.g., rolling element bearings, journal bearings, etc.

The combustor section 38 includes an annular combustor 52 with an annular combustion chamber 54. The combustor 52 of FIG. 1 is configured as a reverse flow combustor. Inlets ports 56/flow tubes into the combustion chamber 54, for example, may be arranged at (e.g., on, adjacent or proximate) and/or towards an aft bulkhead wall 58 of the combustor 52. An outlet from the combustor 52 may be arranged axially aft of an inlet to the turbine section 39. The combustor 52 may also be arranged radially outboard of and/or axially overlap at least a (e.g., aft) portion of the turbine section 39. With this arrangement, the core flowpath 34 of FIG. 1 reverses direction (e.g., from a forward-to-aft direction to an aft-to-forward direction) a first time as the core flowpath 34 extends from a diffuser plenum 60 surrounding the combustor 52 into the combustion chamber 54. The core flowpath 34 of FIG. 1 then reverses direction (e.g., from the aft-to-forward direction to the forward-to-aft direction) a second time as the core flowpath 34 extends from the combustion chamber 54 into the turbine section 39.

During operation, air enters the gas turbine engine 22 through the inlet section 36 and its engine inlet 30. The inlet section 36 directs this air from the engine inlet 30 into the core flowpath 34 and the compressor section 37. The air within the core flowpath 34 may be referred to as core air. This core air is compressed by the compressor rotor 44 and directed through a diffuser and its plenum 60 into the combustion chamber 54. Fuel is injected and mixed with the compressed core air to provide a fuel-air mixture. This fuel-air mixture is ignited within the combustion chamber 54, and combustion products thereof flow through the turbine section 39 and cause the turbine rotor 46 to rotate. The rotation of the turbine rotor 46 drives rotation of the compressor rotor 44 and, thus, compression of the air received from the engine inlet 30. The exhaust section 40 receives the combustion products from the turbine section 39. The exhaust section 40 directs the received combustion products out of the gas turbine engine 22 to provide forward engine thrust.

The static engine structure 42 of FIG. 1 is formed by one or more stationary structures 64 and 66. These stationary structures 64 and 66 respectively form discrete sub-structures (e.g., axial sections) of the static engine structure 42. The forward, upstream stationary structure 64 and/or the aft, downstream stationary structure 66 may each be formed as (or part of) a monolithic body 68, 70 (e.g., a monolithic vehicle component), respectively. Herein, the term "monolithic" may describe a component of the vehicle which is formed as a single unitary body. Each stationary structure 64, 66, for example, may be additively manufactured, cast, machined and/or otherwise formed as an integral, unitary body. By contrast, a non-monolithic body may include parts that are discretely formed from one another, where those parts are subsequently mechanically fastened and/or otherwise attached to one another.

The upstream stationary structure 64 may form a section of the static engine structure 42 along any one or more or all of the engine sections 36 and 37. The upstream stationary structure 64 of FIG. 1, for example, includes an inlet nozzle 72 and at least a forward, upstream section (or an entirety) of a compressor case 74. The upstream stationary structure 64 may also include an internal support structure for at least one of the bearings 50; e.g., the forward bearing 50A.

The inlet nozzle 72 is disposed within the inlet section 36, for example, at the engine inlet 30. This inlet nozzle 72 may be configured to condition the core air entering the compressor section 37. The inlet nozzle 72 of FIG. 1, for example, includes one or more inlet guide vanes configured to impart swirl to the core air. These inlet guide vanes are arranged circumferentially about the axial centerline 28 in an annular array; e.g., an inlet nozzle vane array. Each of the inlet guide vanes extends radially across the core flowpath 34 between and is connected to an inner platform of the inlet nozzle 72 and an outer platform of the inlet nozzle 72.

The compressor case 74 houses the compressor section 37 and its compressor rotor 44. The compressor case 74, for example, extends circumferentially about (e.g., circumscribes) and axially overlaps the compressor rotor 44. The compressor case 74 may thereby form an outer peripheral boundary of the core flowpath 34 within the compressor section 37.

The downstream stationary structure 66 may form a section of the static engine structure 42 along any one or more or all of the engine sections 38-40. The downstream stationary structure 66 of FIG. 1, for example, includes a diffuser nozzle 76, an outer diffuser (e.g., plenum) case 78, the combustor 52, a turbine nozzle 80, a turbine case 82 and an exhaust case 84. The downstream stationary structure 66 may also include an internal support structure for at least one of the bearings 50; e.g., the aft bearing 50B.

The diffuser nozzle 76 is disposed within the diffuser upstream of the plenum 60. This diffuser nozzle 76 may be configured to condition the core air leaving the compressor section 37 and entering the plenum 60. The diffuser nozzle 76 of FIG. 1, for example, includes one or more diffuser guide vanes configured to impart swirl to the core air. These diffuser guide vanes are arranged circumferentially about the axial centerline 28 in an annular array; e.g., a diffuser nozzle vane array. Each of the diffuser guide vanes extends radially across the core flowpath 34 between and is connected to an inner platform of the diffuser nozzle 76 and an outer platform of the diffuser nozzle 76.

The diffuser case 78 houses the combustor 52 within the combustor section 38. The diffuser case 78, for example, extends circumferentially about (e.g., circumscribes), axially overlaps and is spaced radially outward from the combustor 52. The diffuser case 78 may thereby form an outer peripheral boundary of the core flowpath 34 and the plenum 60 along the combustor 52. The outer platform of the diffuser nozzle 76 may be formed as a forward, upstream extension of the diffuser case 78.

The combustor 52 of FIG. 1 includes an outer combustor wall 86, an inner combustor wall 88 and the bulkhead wall 58. The outer combustor wall 86 extends axially between and may be connected to an outer platform of the turbine nozzle 80 and the bulkhead wall 58. The outer combustor wall 86 extends circumferentially about (e.g., circumscribes), axially overlaps and is spaced radially outward from the inner combustor wall 88. The inner combustor wall 88 extends axially between an inner platform of the turbine nozzle 80 and the bulkhead wall 58, and the inner combustor wall 88 may be connected to the bulkhead wall 58. The inner combustor wall 88 extends circumferentially about (e.g., circumscribes), axially overlaps and is spaced radially outward from the turbine case 82. The bulkhead wall 58 extends radially between the outer combustor wall 86 and the inner combustor wall 88, at aft ends of the combustor walls 86 and 88. With this arrangement, the combustor walls 58, 86 and 88 collectively form peripheral boundaries of the combustion chamber 54 within the combustor 52.

The turbine nozzle 80 is disposed within the turbine section 39, for example, at an intersection between the combustor section 38 and the turbine section 39. This turbine nozzle 80 may be configured to condition the combustion products leaving the combustor section 38 and its combustion chamber 54 and entering the turbine section 39. The turbine nozzle 80 of FIG. 1, for example, includes one or more turbine guide vanes configured to impart swirl to the combustion products. These turbine guide vanes are arranged circumferentially about the axial centerline 28 in an annular array; e.g., a turbine nozzle vane array. Each of the turbine guide vanes extends radially across the core flowpath 34 between and is connected to the inner platform of the turbine nozzle 80 and the outer platform of the turbine nozzle 80.

The turbine case 82 houses at least a portion of the turbine section 39 and its turbine rotor 46. The turbine case 82, for example, extends circumferentially about (e.g., circumscribes) and axially overlaps at least a (e.g., aft, downstream) portion of the turbine rotor 46. The turbine case 82 may thereby form an outer peripheral boundary of the core flowpath 34 within at least a (e.g., aft, downstream) portion of the compressor section 37.

The exhaust case 84 extends axially between and to one or more of the engine cases 78 and 82 and the engine exhaust 32. The exhaust case 84 may also be connected to the diffuser case 78 and/or the turbine case 82 at aft ends thereof. The exhaust case 84 extends circumferentially about (e.g., completely around) the axial centerline 28. The exhaust case 84 may thereby form an outer peripheral boundary of the core flowpath 34 within the exhaust section 40 to the engine exhaust 32.

An aft, downstream end of the upstream stationary structure 64 is mated with and connected to a forward, upstream end of the downstream stationary structure 66. The upstream stationary structure 64 of FIG. 1, for example, is attached to the downstream stationary structure 66 by at least one mechanical joint; e.g., a bolted flange connection. However, in other embodiments, the upstream stationary structure 64 may also or alternatively be attached to the downstream stationary structure 66 by at least one bond joint; e.g., a braze connection, a welded connection, etc.

Figure 3:
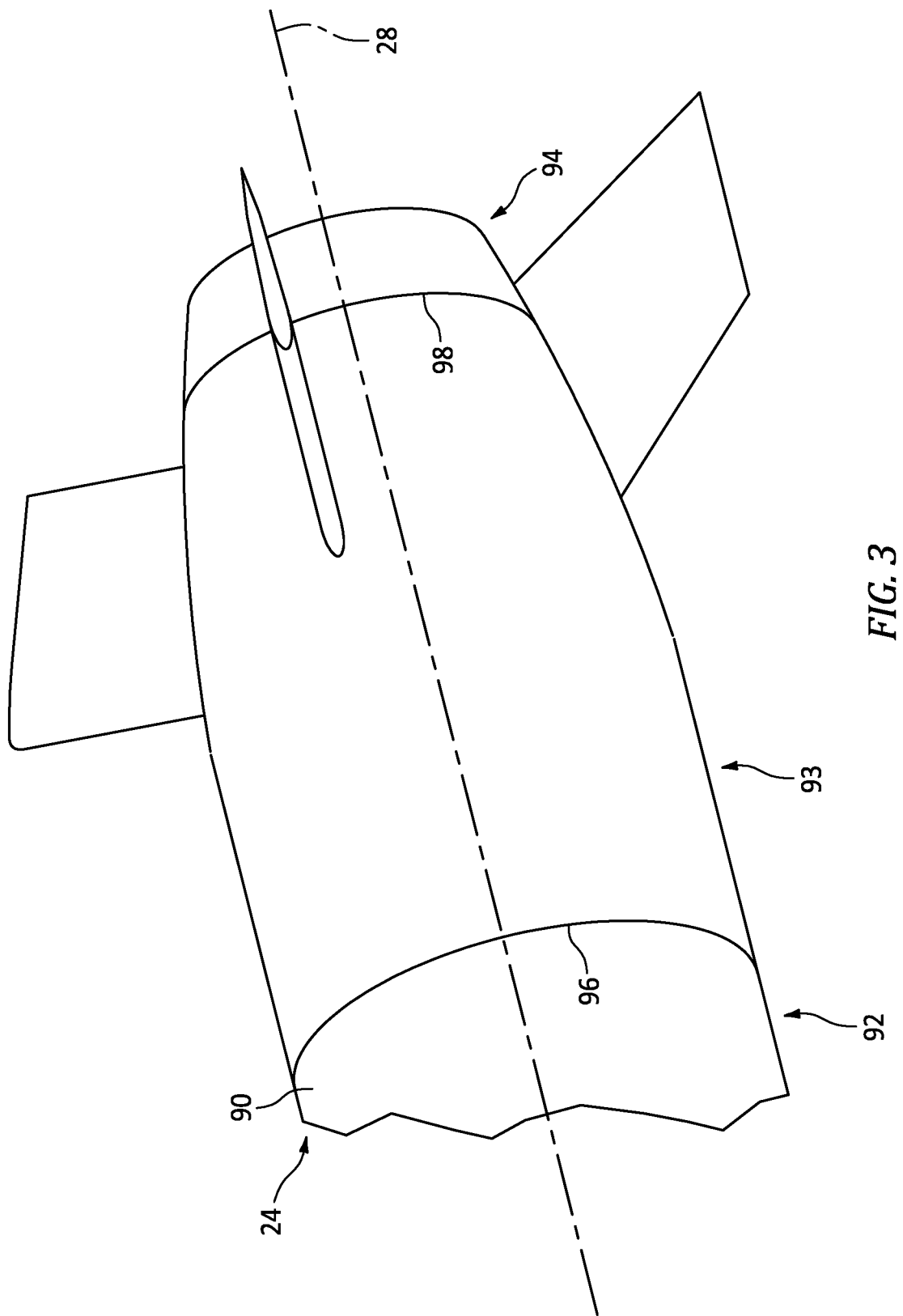
FIG. 3 is a partial perspective illustration of a vehicle body.

The vehicle body 24 is configured to (e.g., completely) house the gas turbine engine 22. The vehicle body 24 may also be configured to form an outer (e.g., exterior) aerodynamic surface 90 for the vehicle; see also FIG. 3. The vehicle body 24, for example, may be configured as a nacelle for the gas turbine engine 22. The vehicle body 24 may also or alternatively be configured as a fuselage and/or another airframe component for the vehicle.

The vehicle body 24 of FIG. 1 includes a plurality of body sections 92-94; e.g., generally tubular exterior vehicle walls. The first body section 92 may be configured as a forward, upstream section of the vehicle body 24. The second body section 93 may be configured as an intermediate section of the vehicle body 24. The third body section 94 may be configured as an aft, downstream section of the vehicle body 24. While the vehicle body 24 of FIG. 1 includes three body sections, a greater or lesser number of body sections are contemplated herein.

Each of the body sections 92, 93, 94 extends circumferentially about (e.g., completely around) the axial centerline 28 providing that respective body section 92, 93, 94 with a tubular geometry. The first body section 92 and the second body section 93 of FIG. 1 may each extends circumferentially about (e.g., circumscribe) and axially along (e.g., overlap) the gas turbine engine 22. The second body section 93, in particular, extends axially along the axial centerline 28 between a forward, upstream end 96 of the second body section 93 and an aft, downstream end 98 of the second body section 93. The upstream end 96 of the second body section 93 may be axially aligned with (or disposed axially near) an interface between the stationary structures 64 and 66. The downstream end 98 of the second body section 93 may be axially aligned with (or disposed axially near) the engine exhaust 32. The first body section 92 may be attached to the second body section 93 at the upstream end 96 of the second body section 93 through a mechanical joint; e.g., a bolted flange coupling. The third body section 94 may be attached to the second body section 93 at the downstream end 98 of the second body section 93 through a mechanical joint; e.g., a bolted flange coupling. Of course, in other embodiments, the second body section 93 may also or alternatively be attached to the first body section 92 and/or the third body section 94 through a bond connection; e.g., a brazed connection, a welded connection, etc.

Figure 2:
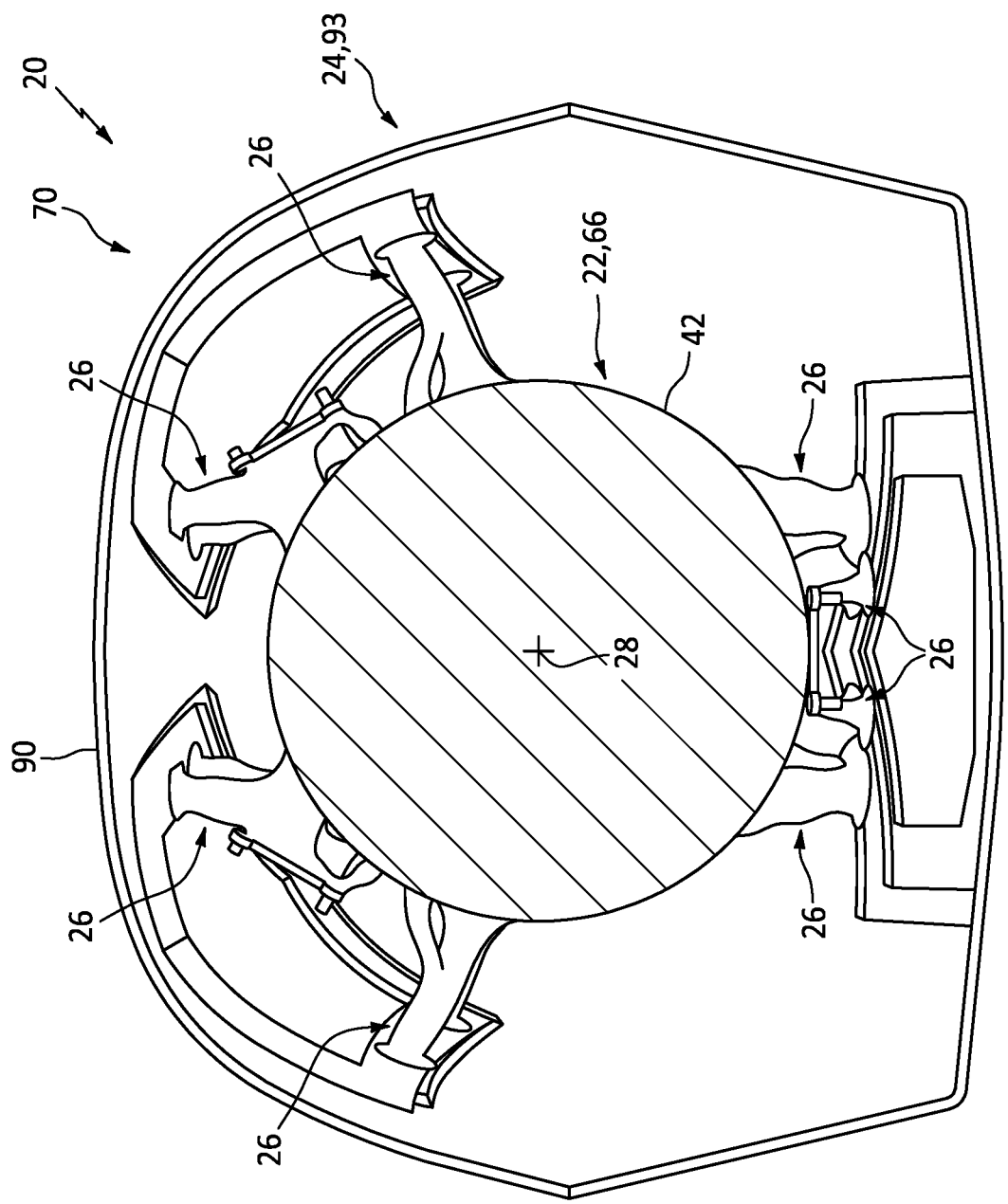
FIG. 2 is a cross-sectional illustration of the vehicle assembly of FIG. 1 with its gas turbine engine schematically shown.

The support structures 26 of FIGS. 1 and 2 are configured to support and position the gas turbine engine 22 within the vehicle body 24. Each support structure 26 of FIGS. 1 and 2, for example, extends radially between and is connected to (1) the static engine structure 42 and its downstream stationary structure 66 and (2) the vehicle body 24 and its second body section 93. Each support structure 26 may thereby (e.g., directly) connect the static engine structure 42 and its downstream stationary structure 66 to the vehicle body 24 and its second body section 93. The downstream stationary structure 66 of FIG. 1 may connect the upstream stationary structure 64 to the support structures 26. Each support structure 26 may thereby also (e.g., indirectly) connect the upstream stationary structure 64 to the vehicle body 24 and its second body section 93.

Each support structure 26 of FIGS. 1 and 2 may be formed integral with the downstream stationary structure 66 and/or the second body section 93 as part of the monolithic body 70; e.g., the monolithic vehicle component. The support structures 26, the downstream stationary structure 66 and the second body section 93, for example, may be additively manufactured, cast, machined and/or otherwise formed together as a common integral, unitary body. Such a configuration facilitates integrating the gas turbine engine 22 into a (e.g., monocoque) power module. The vehicle may thereby be readily provided with different power module configurations (e.g., thrust ratings, mission ranges, etc.) based on, for example, specific mission requirements, etc. Power modules may also be readily swapped out for maintenance, repair, etc. when needed. Furthermore, providing the monolithic body 70 may reduce complexity and/or a part count for the vehicle, which may in turn reduce manufacturing and/or assembly costs of the vehicle.

Each support structure 26 of FIGS. 1 and 2 may include one or more interconnected support members. The support structure 26 of FIG. 4, for example, includes a first (e.g., aft, downstream) support member 100A, a second (e.g., intermediate) support member 100B and a third (e.g., forward, upstream) support member 100C. Each of these support members 100A, 100B, 100C (generally referred to as "100") may be configured as or otherwise include a strut. Examples of the strut include, but are not limited to, a stanchion, a post, a ligament, a beam, an arm and a leg. Each of the support members 100 is connected to one or more of the other support members 100 within the respective support structure 26. One, some or all of the support members 100 may also be connected to an engine case the downstream stationary structure 66 and/or at least a section of the vehicle body 24.

Figure 4:
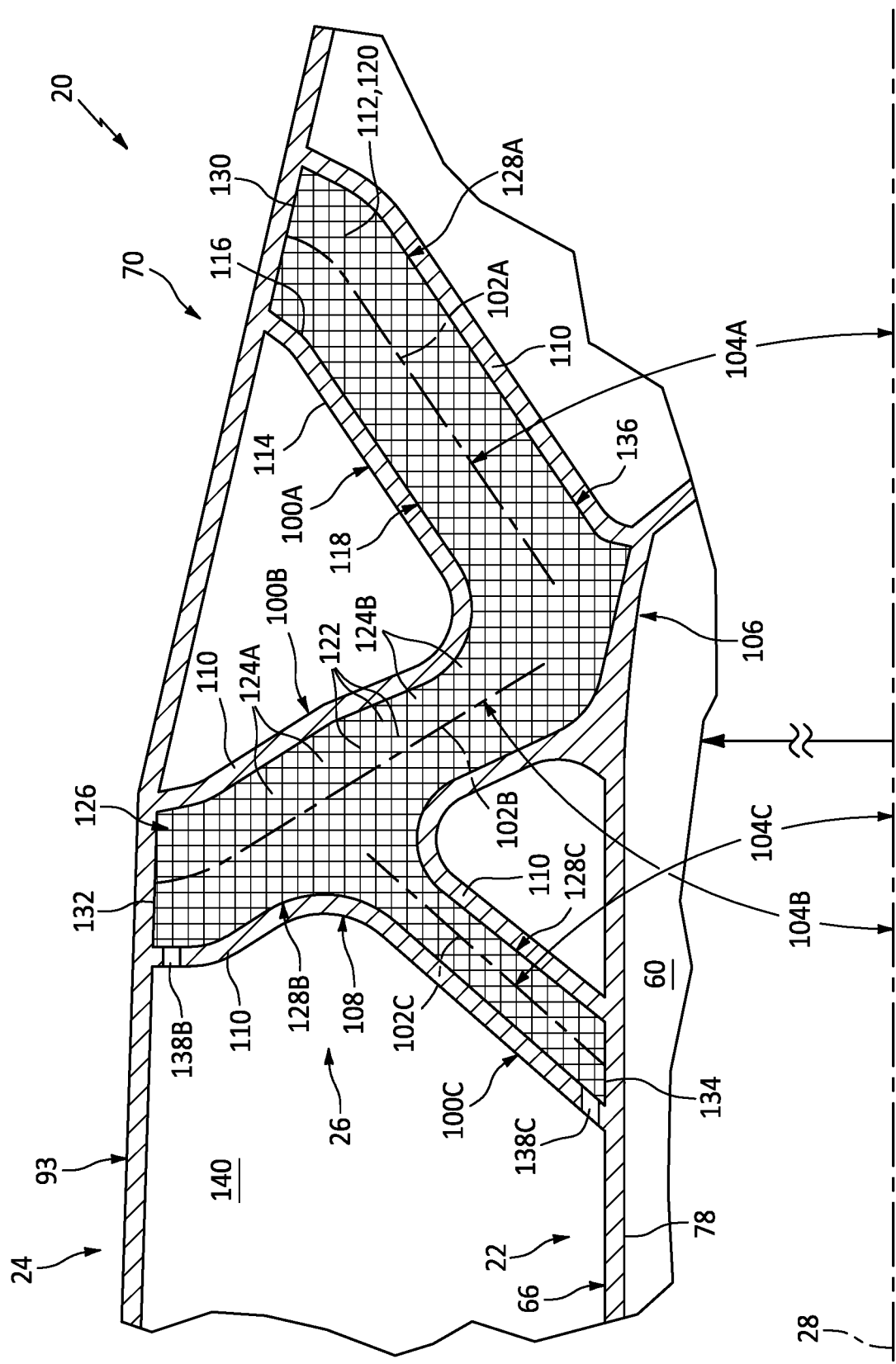
FIG. 4 is a partial side sectional illustration of a body for the vehicle assembly of FIG. 1.

The first support member 100A of FIG. 4 projects out from the diffuser case 78 along a first member trajectory 102A to the second body section 93. This first support member 100A is connected to (e.g., formed integral with) the diffuser case 78 and the second body section 93. The first member trajectory 102A of FIG. 4 includes at least (or only) a radial component in a first (e.g., outward) radial direction and an axial component in a first (e.g., aft, downstream) axial direction. The first member trajectory 102A is thereby angularly offset from the axial centerline 28 by a (e.g., acute) first member angle 104A when viewed, for example, in a reference plane parallel with (e.g., that includes) the axial centerline 28. This first member angle 104A may be equal to or less than about (e.g., within +/−2°) or exactly forty-five degrees (45°); however, the present disclosure is not limited to such an exemplary arrangement. The first member trajectory 102A may be a straight line trajectory. Alternatively, the first member trajectory 102A may follow a curved or otherwise non-straight path.

The second support member 100B of FIG. 4 projects out from the diffuser case 78 along a second member trajectory 102B to the second body section 93. This second support member 100B is connected to (e.g., formed integral with) the diffuser case 78 and the second body section 93. The second member trajectory 102B of FIG. 4 includes at least (or only) a radial component in the first radial direction and an axial component in a second (e.g., forward, upstream) axial direction. The second member trajectory 102B is thereby angularly offset from the axial centerline 28 by a (e.g., acute) second member angle 104B when viewed, for example, in the reference plane. This second member angle 104B may be substantially (e.g., within +/−2°) or exactly equal to the first member angle 104A, or alternatively different (e.g., greater or less) than the first member angle 104A. The second member angle 104B, for example, may be equal to or less than about (e.g., within +/−2°) or exactly forty-five degrees (45°); however, the present disclosure is not limited to such an exemplary arrangement. The second member trajectory 102B may be a straight line trajectory. Alternatively, the second member trajectory 102B may follow a curved or otherwise non-straight path.

The second support member 100B may be connected to the first support member 100A at (e.g., on, adjacent or proximate) the diffuser case 78. The second support member 100B of FIG. 4, for example, intersects with and is connected to the first support member 100A and the diffuser case 78 at an intersection 106; e.g., a common node therebetween. With this arrangement, the first support member 100A and the second support member 100B (e.g., axially) converge towards (e.g., to) one another as each support member 100A, 100B extends towards the downstream stationary structure 66 and its diffuser case 78. Conversely, the first support member 100A and the second support member 100B (e.g., axially) diverge away from one another as each support member 100A, 100B extends along its trajectory 102A, 102B away from the downstream stationary structure 66 and its diffuser case 78.

The third support member 100C of FIG. 4 projects out from the diffuser case 78 along a third member trajectory 102C to the second support member 100B. This third support member 100C is connected to (e.g., formed integral with) the diffuser case 78 and the second support member 100B. The third member trajectory 102C of FIG. 4 includes at least (or only) a radial component in the first radial direction and an axial component in the first axial direction. The third member trajectory 102C is thereby angularly offset from the axial centerline 28 by a (e.g., acute) third member angle 104C when viewed, for example, in the reference plane. This third member angle 104C may be substantially (e.g., within +/−2°) or exactly equal to the first member angle 104A and/or the second member angle 104B, or alternatively different (e.g., greater or less) than the first member angle 104A and/or the second member angle 104B. The third member angle 104C, for example, may be equal to or less than about (e.g., within +/−2°) or exactly forty-five degrees (45°); however, the present disclosure is not limited to such an exemplary arrangement. The third member trajectory 102C may be a straight line trajectory. Alternatively, the third member trajectory 102C may follow a curved or otherwise non-straight path.

The third support member 100C may be connected to the second support member 100B away (e.g., remote) from the diffuser case 78. The third support member 100C of FIG. 4, for example, intersects with and is connected to the second support member 100B at an intersection 108; e.g., a common node therebetween. This intersection 108 between the second support member 100B and the third support member 100C is spaced (e.g., radially) outward from the downstream stationary structure 66 and its diffuser case 78. With this arrangement, the second support member 100B and the third support member 100C (e.g., axially) diverge from one another as each support member 100B, 100C extends towards the downstream stationary structure 66 and its diffuser case 78. Conversely, the second support member 100B and the third support member 100C (e.g., axially) converge towards (e.g., to) one another as each support member 100B, 100C extends along its trajectory 102B, 102C away from the downstream stationary structure 66 and its diffuser case 78.

The support structure 26 of FIG. 4 and one or more or all of its support members 100 may be formed from or otherwise include an exterior wall 110 and an internal cellular core 112. The exterior wall 110 may completely surround the cellular core 112. The exterior wall 110 of FIG. 5, for example, circumscribes the cellular core 112 such that the cellular core 112 is embedded within the support structure 26 and its respective support member(s) 100. This exterior wall 110 extends depthwise between and to an exterior surface 114 of the exterior wall 110 and an interior surface 116 of the exterior wall 110. The wall exterior surface 114 may at least partially or completely form an exterior of the support structure 26 and its respective support member(s) 100. The wall interior surface 116 may at least partially or completely form an internal cavity 118 within the support structure 26 and its respective support member(s) 100.

Figure 5:
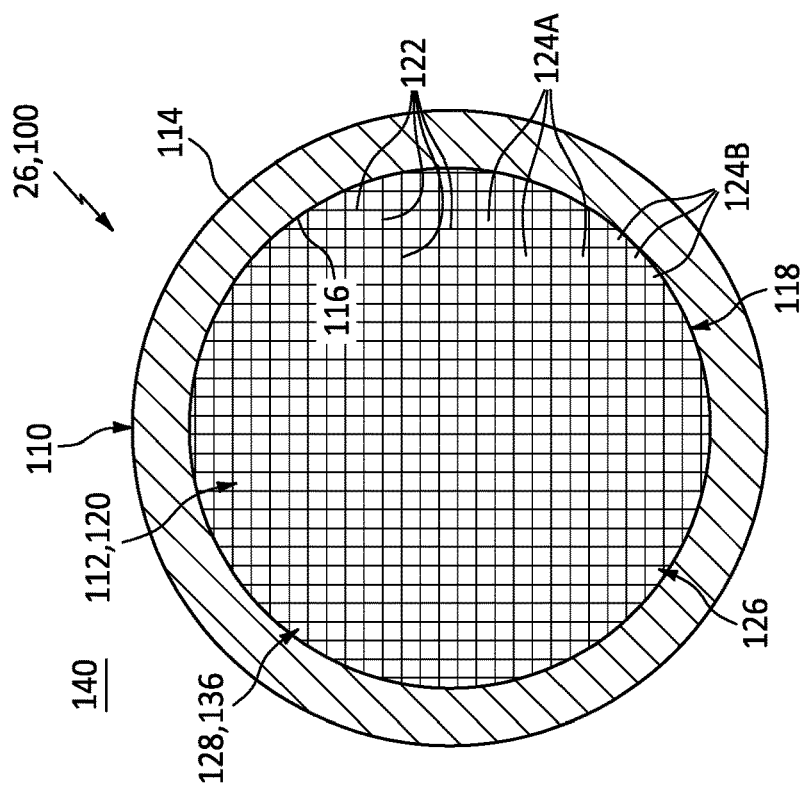
FIG. 5 is a cross-sectional illustration of a support structure member.

The cellular core 112 is disposed within the support structure internal cavity 118. The cellular core 112 is connected to (e.g., formed integral with) the exterior wall 110 at its interior surface 116. The cellular core 112 of FIG. 5 is configured as or otherwise includes an internal lattice 120; e.g., a cellular structure. This internal lattice 120 includes an interconnected network of core (e.g., lattice) members 122 (only some of which are labeled for ease of illustration). These core members 122 along with the exterior wall 110 may form a network of fluidly coupled interstices 124A and 124B (generally referred to as "124"; only some of which are labeled for ease illustration); e.g., voids, spaces, gaps, etc. The inner interstices 124A are disposed within the internal lattice 120 and are formed between neighboring core members 122. The outer interstices 124B are disposed between the exterior wall 110 and the cellular core 112. These outer interstices 124B, for example, are formed between the wall interior surface 116 and respective (e.g., outer) core members 122. The inner interstices 124A and the outer interstices 124B may collectively form a single internal volume 126 (or alternatively multiple internal volumes) within and that extends within the support structure 26 and one or more or all of its support members 100. Following (e.g., complete) manufacture of the support structure 26, this internal volume 126 may be an empty volume; e.g., filled (e.g., only) with a gas such as air. With such an arrangement, the support structure 26 may be configured as a lightweight, robust structural support for the downstream stationary structure 66 (e.g., see FIG. 4).

Figure 6A:
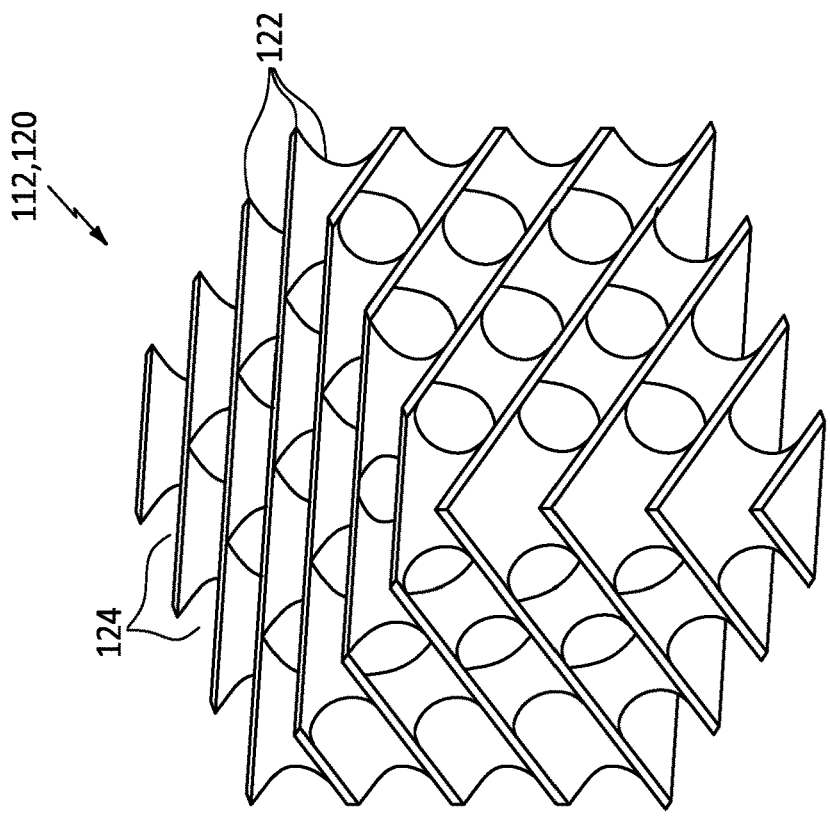
FIGS. 6A-C are partial perspective illustrations of a cellular core with various lattice arrangements.
Figure 6C:
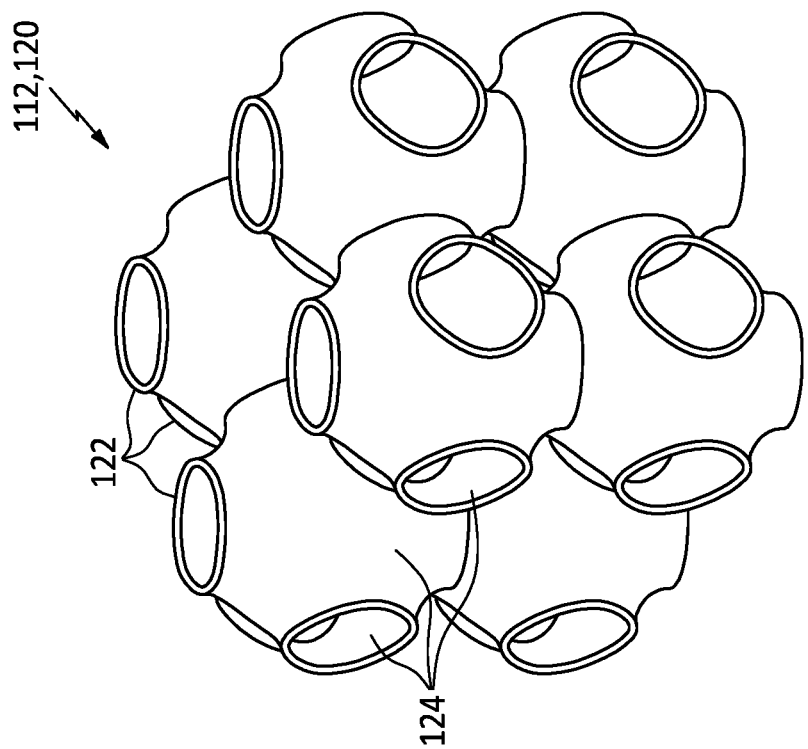
Figure 6B:
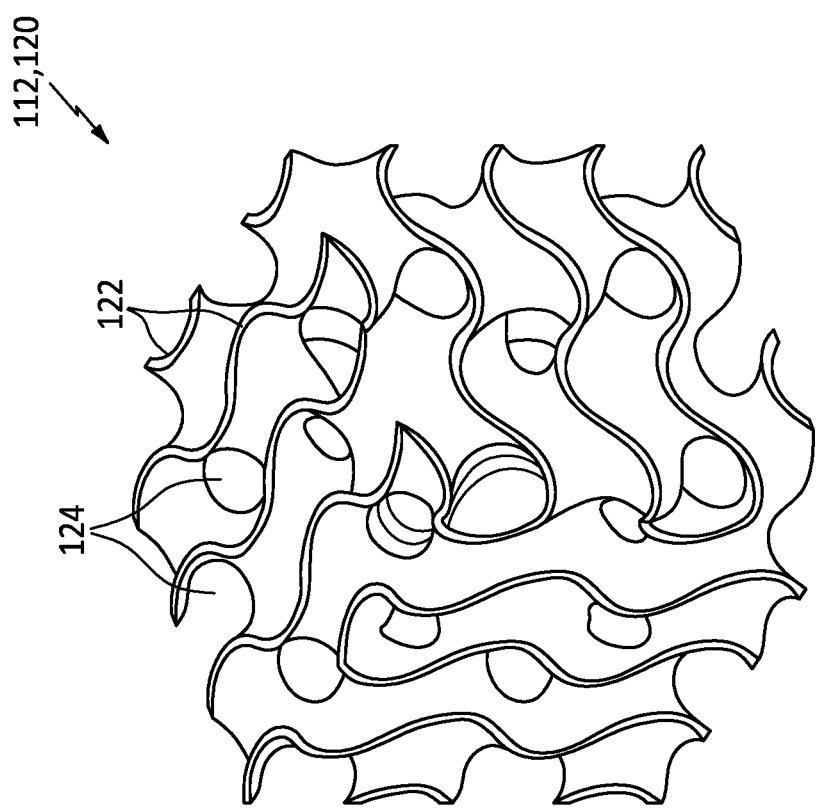

Referring to FIGS. 6A-C, the internal lattice 120 may be configured as a triply period minimal surface (TPMS) structure. Examples of the TPMS structure include, but are not limited to, a Schwarz diamond (D) structure (e.g., see FIG. 6A), a Schoen gyroid structure (e.g., see FIG. 6B) and a Schwarz primitive (P) structure (e.g., see FIG. 6C). The present disclosure, however, is not limited to such exemplary TPMS structure configurations. The TPMS structure, for example, may alternatively be configured as a Neovius structure or a Lidinoid structure. Furthermore, the internal lattice 120 of the present disclosure is not limited to TPMS structure arrangements.

Referring to FIG. 4, the internal volume 126 and its interstices 124 provide the support structure 26 with one or more member passages 128A-C (generally referred to as "128"). The first member passage 128A may be formed within the first support member 100A. The first member passage 128A of FIG. 4, for example, extends longitudinally within the first support member 100A (through its respective interstices 124) from (or proximate) an outer distal end 130 of the first support member 100A to the intersection 106 between the first support member 100A and the second support member 100B. The second member passage 128B may be formed within the second support member 100B. The second member passage 128B of FIG. 4, for example, extends longitudinally within the first support member 100A (through its respective interstices 124) from (or proximate) an outer distal end 132 of the second support member 100B to the intersection 106 between the first support member 100A and the second support member 100B. At this intersection 106, the second member passage 128B may meet and be fluidly coupled with the first member passage 128A. The third member passage 128C may be formed within the third support member 100C. The third member passage 128C of FIG. 4, for example, extends longitudinally within the third support member 100C (through its respective interstices 124) from (or proximate) an inner distal end 134 of the third support member 100C to the intersection 108 between the second support member 100B and the third support member 100C. At this intersection 108, the third member passage 128C may meet and be fluidly coupled with the second member passage 128B; e.g., at an intermediate location longitudinally along the second member passage 128B. With this arrangement, the first member passage 128A, the second member passage 128B (e.g., an inner section thereof) and the third member passage 128C may form segments of a structure passage 136 with the support structure 26. This structure passage 136 may follow a tortuous (e.g., a zigzag, twisting, etc.) trajectory within the support structure 26.

One or more of the passages 128 (e.g., 128B, 128C) may each lead to at least (or only) one respective aperture 138B, 138C (generally referred to as "138") in the support structure 26. The second member passage 128B of FIG. 4, for example, extends longitudinally to and is fluidly coupled with the second member aperture 138B. This second member aperture 138B fluidly couples the second member passage 128B to a plenum 140 exterior to the support structure 26 and the gas turbine engine 22, but within the vehicle body 24. The third member passage 128C and, thus, the structure passage 136 extends longitudinally to and is fluidly coupled with the third member aperture 138C. This third member aperture 138C fluidly couples the third member passage 128C and, thus, the structure passage 136 to the plenum 140.

Figure 7:
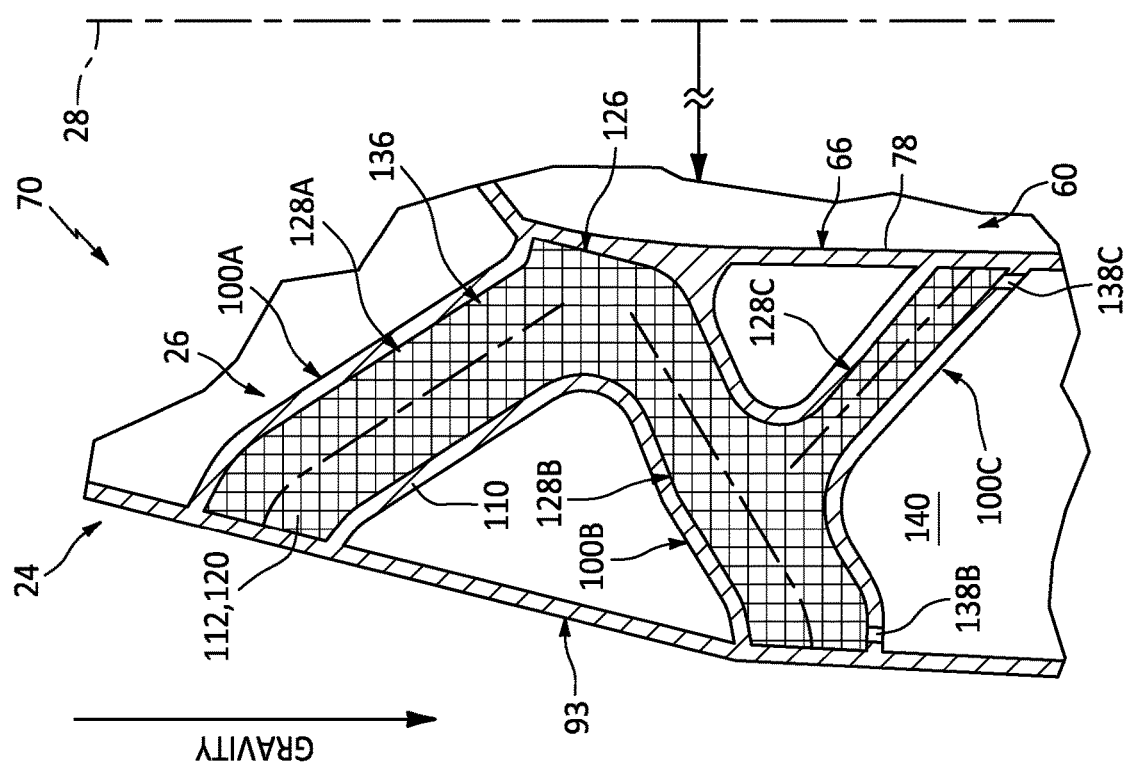
FIG. 7 is a partial side sectional illustration of a body oriented during manufacture thereof.

Referring to FIG. 7, the apertures 138 may be positioned at gravitational lowest points along the respective passages 128, 136 when, for example, the axial centerline 28 is positioned vertically up and down with respect to gravity. In this position, the third member aperture 138C may be positioned at a gravitational bottom of the internal volume 126. With such an arrangement, the apertures 138 may provide ports/outlets to facilitate (e.g., complete) evacuation of build material (e.g., unused, non-solidified powder) from the internal volume 126 during manufacture of the monolithic body 70.

Figure 8:
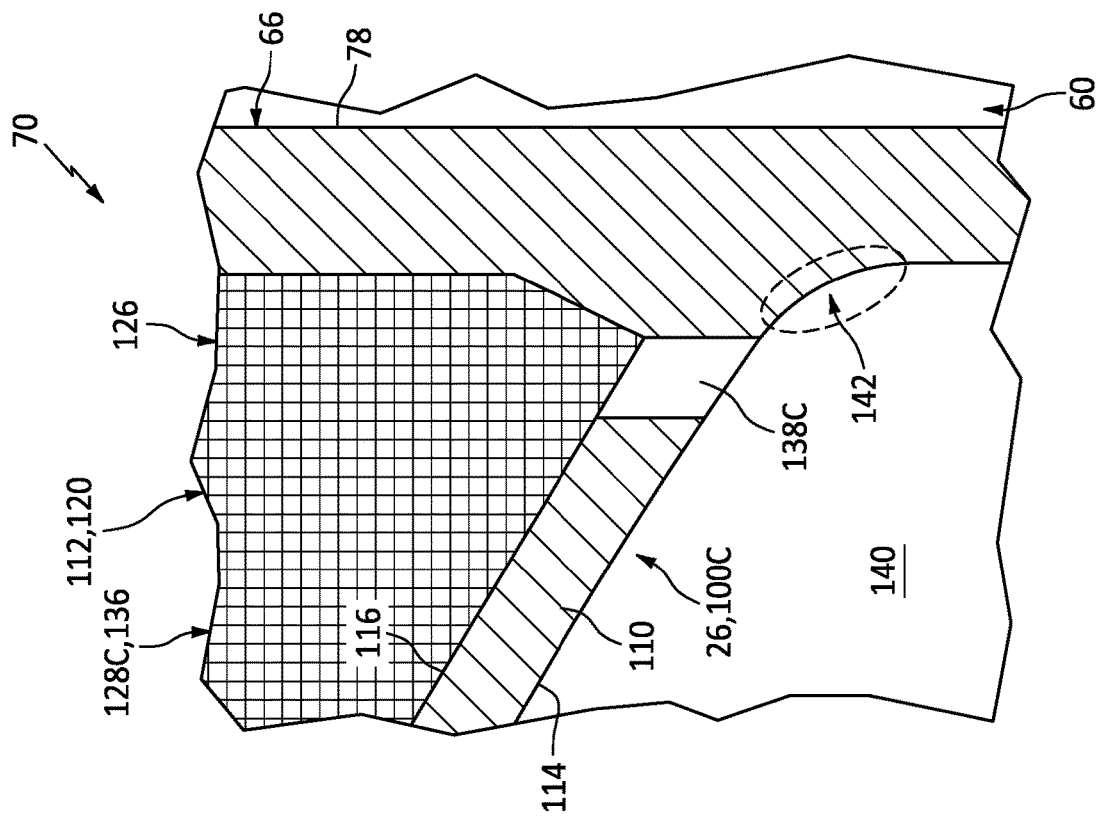
FIG. 8 is a side sectional illustration of a portion of the body of FIG. 7.

Referring to FIG. 8, each aperture 138C (of 138B) may be arranged at an intersection between (A) the support structure 26 and its respective support member 100C (or 100B) and (B) the neighboring body element 66 (or 93). Each aperture 138C (of 138B), for example, may be formed by and project through the exterior wall 110 at the distal end of the respective support member 100C (or 100B). However, the aperture 138C (of 138B) may be located outside of a fillet 142 between (A) the support structure 26 and its respective support member 100C (or 100B) and (B) the neighboring body element 66 (or 93). Positioning the aperture 138C (of 138B) outside of the fillet 142 may reduce stress concentrations at the respective intersection. With such an arrangement, each aperture 138C (of 138B) may be arranged at an end (e.g., a gravitational bottom end) of the respective passage 128, 136, and the passage 128, 136 may be extended close to the member distal end without, for example, subjecting the respective support member 100C (or 100B) to significantly higher internal stresses.

Figure 9:
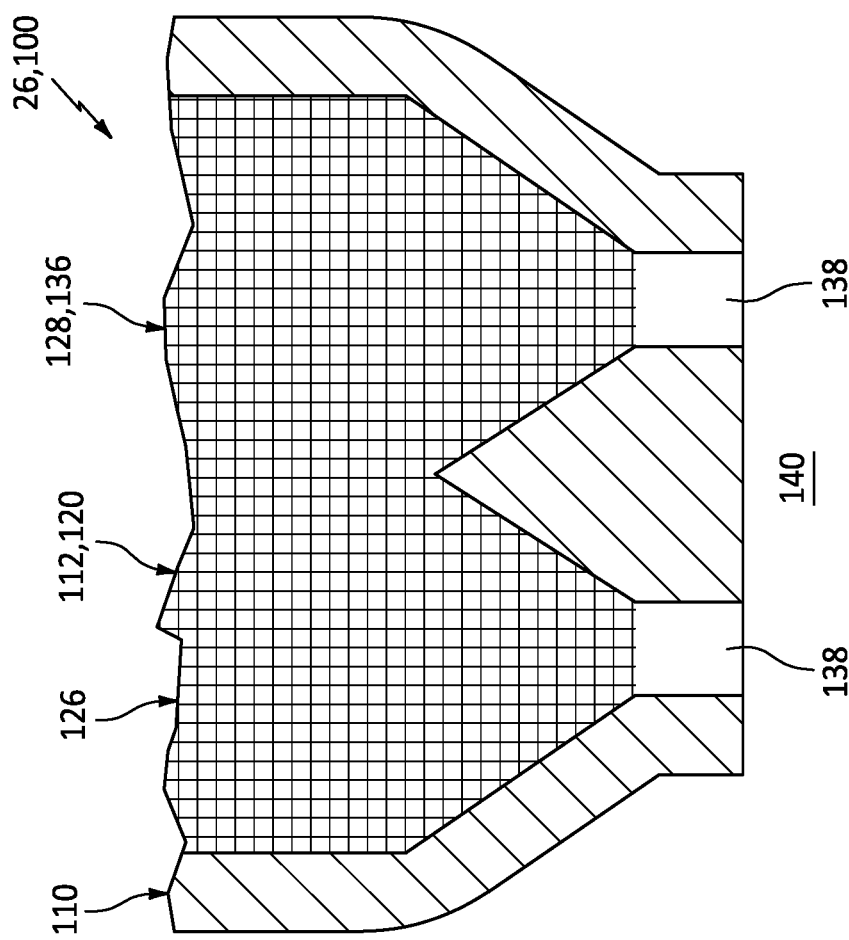
FIG. 9 is a partial side sectional illustration of another support structure member.

In some embodiments, referring to FIG. 8, the passage 128, 136 may laterally taper down to the respective aperture 138 in order to funnel the build material out of the internal volume 126 through the aperture 138. In other embodiments, referring to FIG. 9, the passage 128, 136 may laterally taper down to a multiple of the apertures 138 in order to funnel the build material out of the internal volume 126 through the apertures 138.

Figure 10:
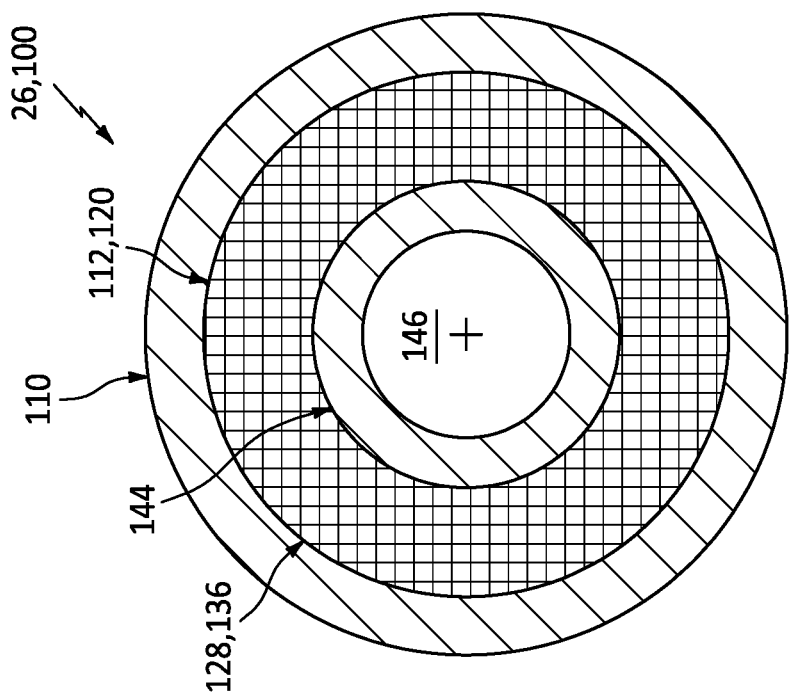
FIG. 10 is a cross-sectional illustration of another support structure member.

In some embodiments, referring to FIG. 5, the cellular core 112 and its internal lattice 120 completely fill and extend across the internal cavity 118 formed by the exterior wall 110. In other embodiments, referring to FIG. 10, the support structure 26 may also include an interior wall 144. This interior wall 144 may form an internal bore 146 within/through the support structure 26 and one or more of its support members 100. Here, the cellular core 112 and its internal lattice 120 circumscribe the interior wall 144. The interior wall 144 may fluidly decouple the internal bore 146 form the internal volume 126. With such an arrangement, the internal bore 146 may provide a passage for flowing/directing fluid (e.g., air, lubricant, fuel, heat exchange fluid, etc.) across the support structure 26 to and/or from the gas turbine engine 22 (see FIG. 1). The internal bore 146 may also provide a path for routing lines such as electrical and/or communication lines to and/or from the gas turbine engine 22 (see FIG. 1).

Figure 11:
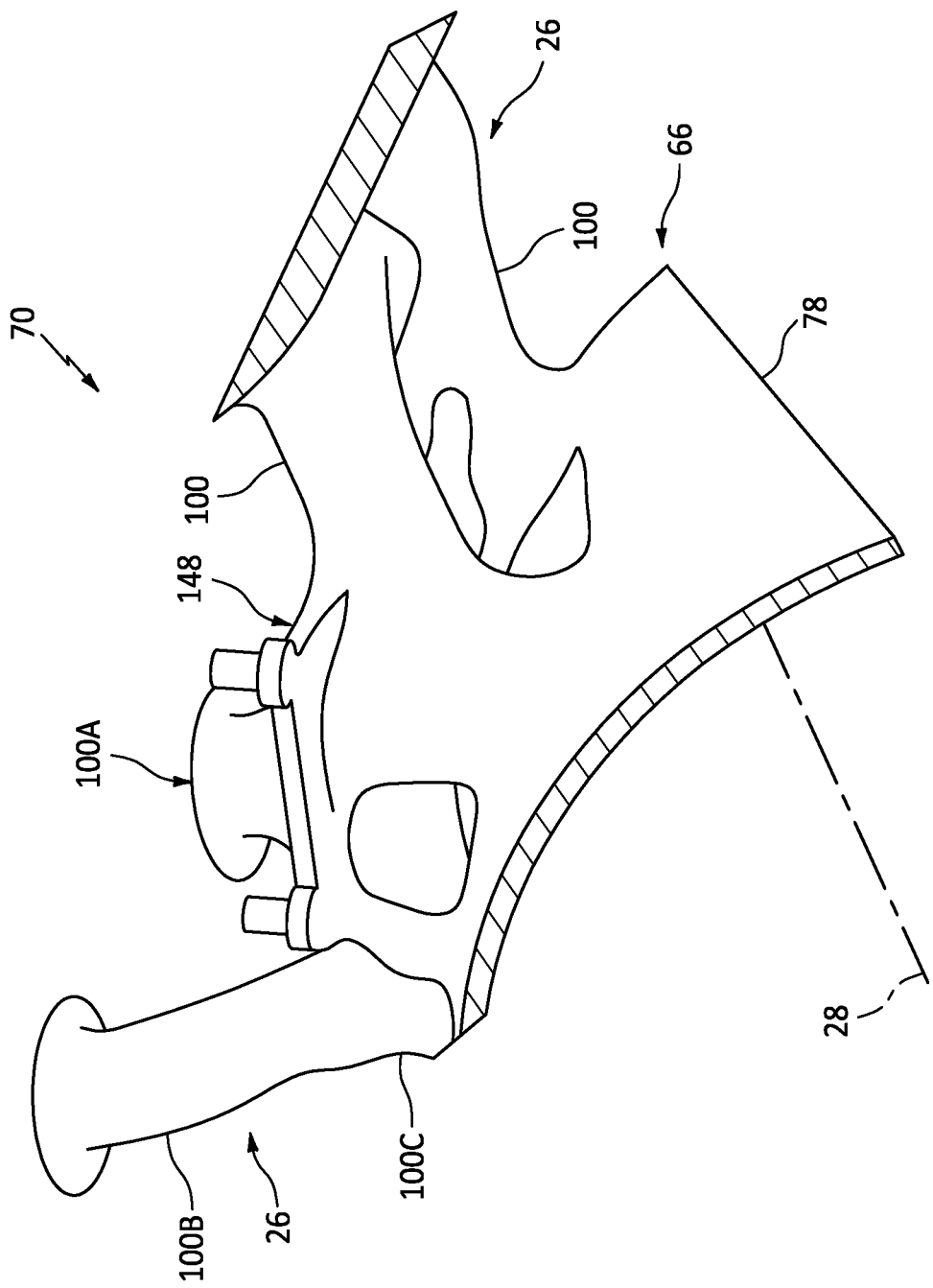
FIG. 11 is a perspective cutaway illustration of a portion of the vehicle assembly of FIG. 1.

In some embodiments, referring to FIG. 11, at least one of the support structures 26 may also include or otherwise be configured with at least (or only) one mount 148; e.g., an actuator mount. This mount 148 may be configured as a solid portion of the support structure 26. The mount 148 of FIG. 11 is configured as a mounting plate, and is disposed at an intermediate location along one or more respective support members 100.

Figure 12:
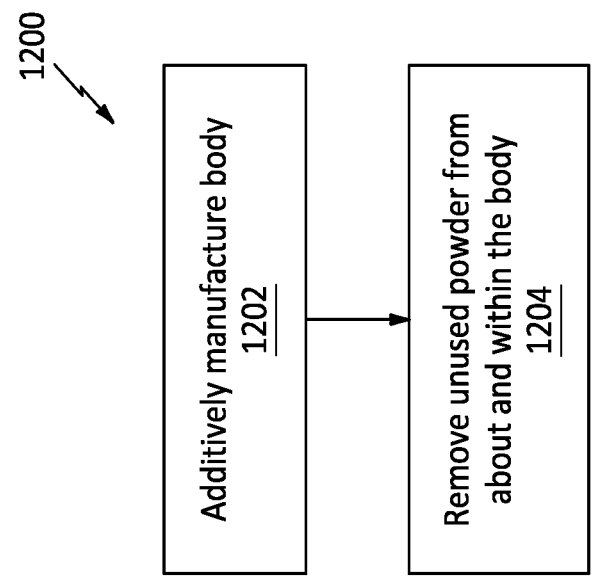
FIG. 12 is a flow diagram of a method for manufacturing an apparatus.

FIG. 12 is a flow diagram of a method 1200 for manufacturing an apparatus for the vehicle. For ease of description, the apparatus may be described below as the downstream monolithic body 70 described above. The present disclosure, however, is not limited to forming such an exemplary body.

Figure 13:
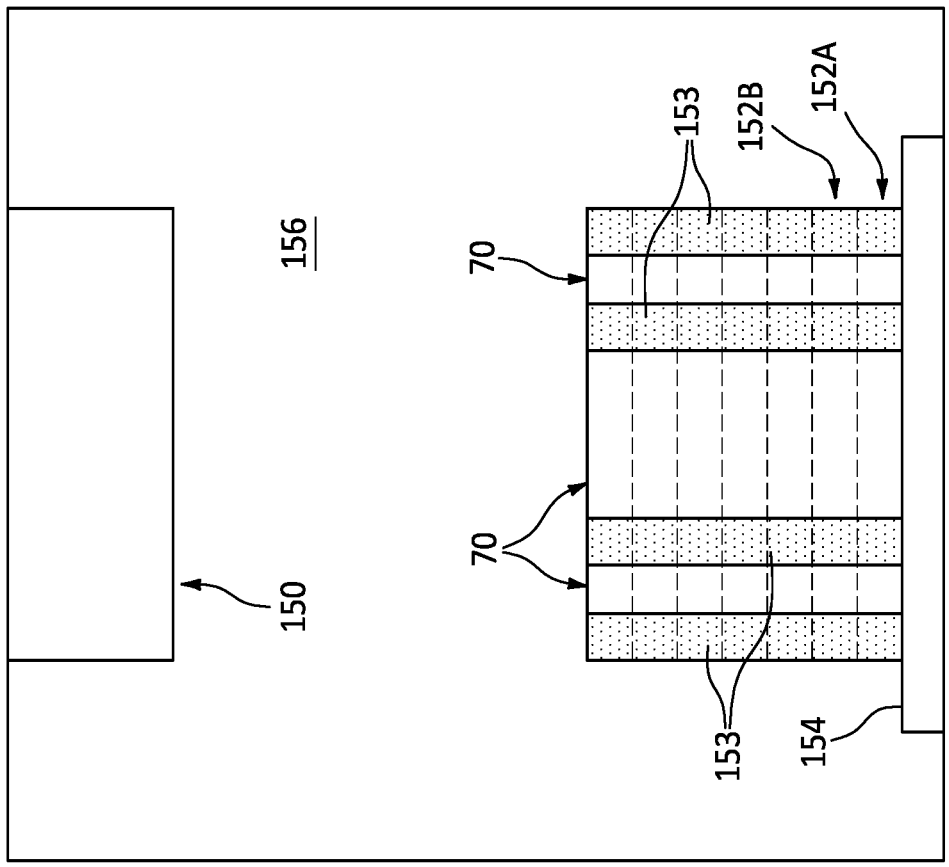
FIG. 13 is a schematic illustration of a device for additively manufacturing the apparatus.

In step 1202, the monolithic body 70 is additively manufactured. For example, referring to FIG. 13, the body 70 may be formed in a layer-by-layer fashion using an additive manufacturing device 150; e.g., an energy (e.g., laser or electron) beam powder bed fusion (PBF) device. This additive manufacturing device 150 may deposit a first layer 152A of additive manufacturing powder 153 (e.g., metal powder) over a support surface 154 within a build space 156. The additive manufacturing device 150 may thereafter selectively solidify (e.g., sinter, fuse, melt, etc.) a select portion of the powder 153 in the first layer 152A using an energy beam (e.g., a laser beam or an electron beam) to form a first portion (e.g., layer, slice) of the body 70. The additive manufacturing device 150 may then deposit a second layer 152B of the powder over the selectively sintered first layer of the powder within the build space 156. The additive manufacturing device 150 may thereafter again selectively solidify a select portion of the powder 153 in the second layer 152B using the energy beam to form a second portion (e.g., layer, slice) of the body. The solidified second portion is also fused to the underlining solidified first portion by the solidifying of the powder 153 in the second layer 152B. This process may be repeated one or more times until the body 70 is (e.g., completely, entirely) formed on the build surface 154.

In the embodiment of FIG. 7, the body 70 is formed such that its axial centerline 28 is positioned vertically up and down with respect to gravity. The body 70 may also be formed such that the apertures 138 are at the gravitational bottoms of the passages 128, 136. The manufacturing method 1200 of the present disclosure, however, is not limited to such an exemplary orientation during the additive manufacturing step 1202.

In step 1204, unused powder (e.g., 153 in FIG. 13) is removed from about and within the body 70. For example, the unused powder surrounding the objection may be extracted from the build space 156. The unused power may also be extracted from out of the internal volume 126 within each respective support structure 26. A vacuum, for example, may be applied to the apertures 138 to vacuum the unused powder out of the respective internal volume 126. The body 70 may also or alternatively be maneuvered (e.g., vibrated, tipped, etc.) to facilitate movement of the unused powder through the internal volume 126 towards the apertures 138. Of course, various other powder extraction methods are known, and the present disclosure is not limited to any particular ones thereof. Note, by canting the support members 100 relative to the axial centerline 28 and by positioning the apertures 138 at the gravitational bottom ends of the passages 128, 136, the apertures 138 may facilitate (e.g., complete, or almost complete) extraction of the unused powder from the interior volume(s) 126.

Following the removal of the unused powder, a rotor assembly (e.g., the elements 44, 46 and 48 of FIG. 1) and other components of the gas turbine engine 22 may be assembled with the body 70. Alternatively, one or more finishing operations may be performed on the body 70 prior to gas turbine engine assembly.

The gas turbine engine 22 is described above as a single spool, radial-flow turbojet gas turbine engine for ease of description. The present disclosure, however, is not limited to such an exemplary gas turbine engine. The gas turbine engine 22, for example, may alternatively be configured as an axial flow gas turbine engine. The gas turbine engine 22 may be configured as a direct drive gas turbine engine. The gas turbine engine 22 may alternatively include a gear train that connects one or more rotors together such that the rotors rotate at different speeds. The gas turbine engine 22 may be configured with a single spool (e.g., see FIG. 1), two spools, or with more than two spools. The gas turbine engine 22 may be configured as a turbofan engine, a turbojet engine, a turboprop engine, a turboshaft engine, a propfan engine, a pusher fan engine or any other type of turbine engine. In addition, while the gas turbine engine 22 is described above with an exemplary reverse flow annular combustor, the gas turbine engine 22 may also or alternatively include any other type/configuration of annular, tubular (e.g., CAN), axial flow and/or reverse flow combustor. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A manufacturing method, comprising:
additively manufacturing a body that includes
an engine case for a gas turbine engine;
a support structure projecting out from the engine case, the support structure including a lattice, a wall and an internal volume, the wall surrounding the lattice, and the internal volume within the support structure along the lattice, wherein the internal volume is filled with powder; and
an aperture at an intersection between the engine case and the support structure; and
extracting the powder from the internal volume through the aperture; wherein the body forms a stationary structure of the gas turbine engine.

2. The manufacturing method of claim 1, wherein the aperture is arranged at a gravitational bottom of the internal volume during at least one of the extracting of the powder or the additive manufacturing of the body.

3. The manufacturing method of claim 1, wherein the aperture projects through the wall.

4. The manufacturing method of claim 1, wherein the aperture is disposed outside of a fillet between the support structure and the engine case.

5. The manufacturing method of claim 1, wherein the internal volume comprises at least one of
interstices within the lattice; or
interstices between the wall and the lattice.

6. The manufacturing method of claim 1, wherein
the internal volume comprises a plurality of passages; and
the powder is extracted from the plurality of passages through the aperture.

7. The manufacturing method of claim 1, wherein the support structure further includes a first member and a second member;
the first member projects out from the engine case along a first trajectory;
the second member projects out from the engine case along a second trajectory that is angularly offset from the first trajectory; and
the internal volume is within the first member and the second member.

8. The manufacturing method of claim 7, wherein the first member diverges away from the second member as the first member extends along the first trajectory.

9. The manufacturing method of claim 7, wherein the first member converges towards the second member as the first member extends along the first trajectory.

10. The manufacturing method of claim 7, wherein an intersection between the first member and the second member is located at the engine case.

11. The manufacturing method of claim 7, wherein an intersection between the first member and the second member is located away from the engine case.

12. The manufacturing method of claim 1, wherein the internal volume comprises a passage that follows a tortuous path through the support structure to the aperture.

13. The manufacturing method of claim 1, wherein the lattice structure comprises a triply periodic minimal surface structure.

14. The manufacturing method of claim 1, wherein
a bore extends within the lattice; and
the bore is fluidly decoupled from the internal volume.

15. The manufacturing method of claim 1, wherein
the body further includes at least a section of a vehicle body; and
the support structure extends between and connects the engine case and the section of the vehicle body.

16. The manufacturing method of claim 1, wherein the body further includes an actuator mount spaced outboard from the engine case.

17. A manufacturing method, comprising:
additively manufacturing a body including an engine case of a gas turbine engine and a support structure projecting out from the engine case, the engine case extending axially along and circumferentially around an axial centerline, the support structure including a lattice, an exterior wall and a passage, the lattice comprising a triply periodic minimal surface structure, the exterior wall surrounding the lattice, and the passage extending within the support structure through the lattice, wherein the body forms a stationary structure of the gas turbine engine; and
extracting powder out of the passage through an aperture in the body.

18. A manufacturing method, comprising:
additively manufacturing a body that includes
an engine case for a gas turbine engine;
a support structure projecting out from the engine case, the support structure including a lattice, a wall and an internal volume, the wall surrounding the lattice, and the internal volume within the support structure along the lattice, wherein the internal volume is filled with powder; and
an aperture at an intersection between the engine case and the support structure; and
extracting the powder from the internal volume through the aperture; wherein
the body further includes a combustor; and
wherein the engine case extends axially along and circumferentially around the combustor.

19. A manufacturing method, comprising:
additively manufacturing a body that includes
an engine case for a gas turbine engine;

a support structure projecting out from the engine case, the support structure including a lattice, a wall and an internal volume, the wall surrounding the lattice, and the internal volume within the support structure along the lattice, wherein the internal volume is filled with powder; and an aperture at an intersection between the engine case and the support structure; and extracting the powder from the internal volume through the aperture; wherein the body is configured to house a compressor rotor and a turbine rotor within an interior volume of the body.

* * * * *